United States Patent
Rice et al.

(10) Patent No.: US 6,788,678 B1
(45) Date of Patent: Sep. 7, 2004

(54) INTERFACE BETWEEN CHANNEL UNITS OF MULTIPLE LOCAL EXCHANGE CARRIERS

(75) Inventors: D. Reagan Rice, Morristown, NJ (US); Ronald R. Brown, Florham Park, NJ (US); Robert L. Adams, III, Florham Park, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/454,930

(22) Filed: Dec. 3, 1999

(51) Int. Cl.[7] .............................. H04L 12/50; H04J 3/12
(52) U.S. Cl. ........................ 370/359; 370/524; 370/523
(58) Field of Search ................. 370/264, 522, 370/523, 524, 463, 466, 419, 358

(56) References Cited

U.S. PATENT DOCUMENTS

| | | | | |
|---|---|---|---|---|
| 5,305,312 A | * | 4/1994 | Fornek et al. ............... | 370/264 |
| 5,519,719 A | * | 5/1996 | Elpers et al. ................ | 714/738 |
| 5,854,835 A | * | 12/1998 | Montgomery et al. . | 379/112.06 |
| 5,875,229 A | * | 2/1999 | Eyuboglu et al. ........... | 375/222 |
| 5,896,390 A | * | 4/1999 | Williams .................... | 370/466 |
| 6,104,730 A | * | 8/2000 | Marks ......................... | 370/523 |
| 6,445,698 B1 | * | 9/2002 | Iwasaki et al. .............. | 370/359 |
| 6,487,222 B1 | * | 11/2002 | Williams ..................... | 370/536 |

OTHER PUBLICATIONS

William Stallings, "ISDN and Broadband ISDN with Frame Relay and ATM", 1998, Prentice–Hall, Inc., 4th Edition, pp. 130–132.*

* cited by examiner

*Primary Examiner*—Andy Lee (57) ABSTRACT

In accordance with the invention, an interface between an incumbent local exchange carrier's central office terminal and a competitive local exchange carrier's remote terminal is provided by an Integrated Services Digital Network interconnection. Such a connection provides two basic data channels of 64 Kbps each and at least one utility channel. The ISDN signal can be carried over a single wire pair. The interface may be used to interconnect one or two digital channels. The channel units may be designed to remove the robbed bits from the data channels and place them in the utility channels. Further, the utility channel may be employed to transmit frame phasing information so that the networks can synchronize their robbed bit signaling so that both networks use the same bit positions for robbed bit signaling thus minimizing data bandwidth reduction due to robbed bit signaling.

40 Claims, 4 Drawing Sheets

INTERFACE BETWEEN CHANNEL UNITS OF MULTIPLE LOCAL EXCHANGE CARRIERS

FIELD OF THE INVENTION

The invention pertains to an interface between the channel units of an incumbent local exchange carrier and a competitive local exchange carrier. More particularly, the invention pertains to an interface for a competitive local exchange carrier interfacing to an incumbent local exchange carrier's digital subscriber loop under the United States Telecommunications Act of 1996.

BACKGROUND OF THE INVENTION

In accordance with the United States Telecommunications Act of 1996, incumbent local exchange carriers (ILECs) that, up to that time, had a monopoly on local telephone service in a given geographic area were required to provide to competitive local exchange carriers (CLECs) access to their connections to subscribers. Accordingly, CLECs could then offer competitive local telephone services to the original ILEC's customers.

The purpose of the Telecommunications Act of 1996 was to foster competition for local telephone service by assuring that a CLEC could provide services to telephone subscribers with quality comparable to that provided by the ILEC. Accordingly, ILECs need to provide an interface between its central office terminals (COTS) and a CLEC's remote terminal (RT). Despite the name, the CLEC's remote terminal (RT) typically is located in the ILEC's Central Office (CO). The CLEC then typically transports the communication channels via its own network facilities from its RT to its own office where it maintains its own telecommunications equipment, including switching fabric.

Figure 1:
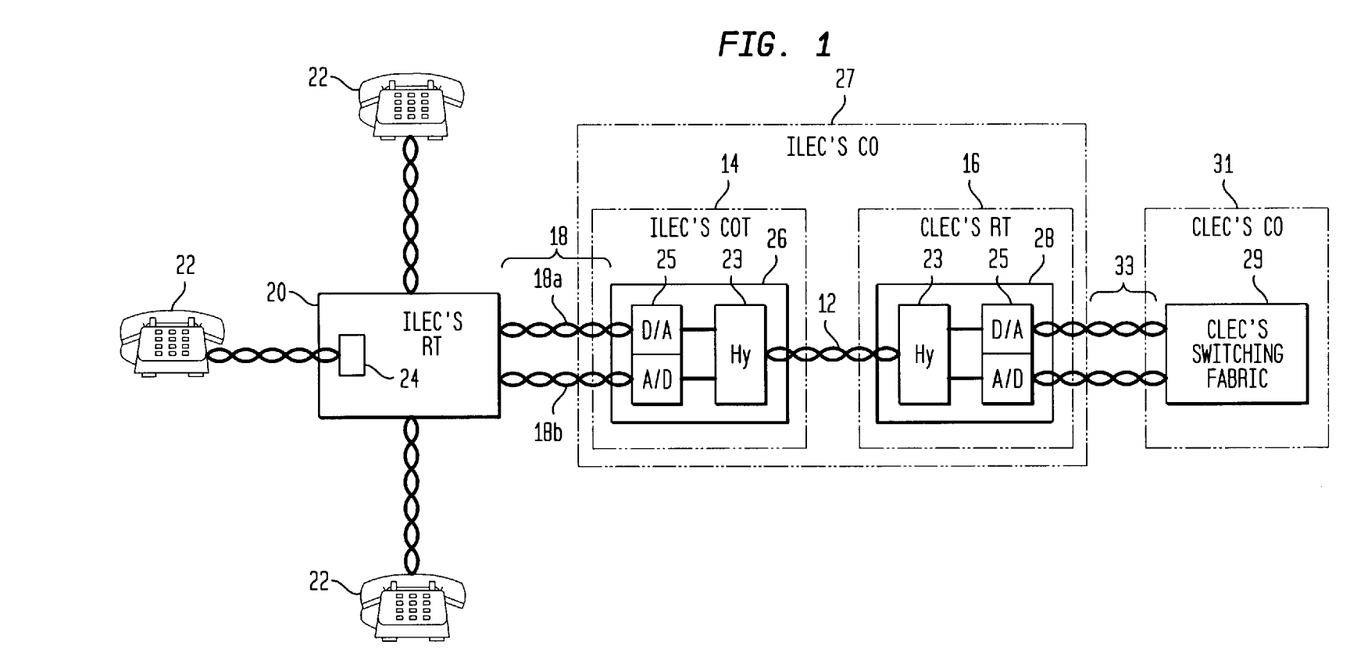
FIG. 1 is a block diagram of a telephone network including an incumbent local exchange carrier and a competitive local exchange carrier in accordance with a prior art scheme.

There are three common schemes in use today for interfacing between an ILEC's COT and a CLEC's RT. The first is an analog VF interconnection as illustrated in FIG. 1. In short, a twisted wire pair 12 is provided between the ILEC's COT 14 and the CLEC's RT 16 and the communication data is transmitted between the two terminals in analog form.

At least one goal of the Telecommunications Act of 1996 is to assure that a CLEC can provide the same grade of service (GoS) as the ILEC to telecommunication subscribers. However, many, if not most, ILEC telecommunications networks utilize digital loop carrier (DLC) systems 18 between their central office terminals, e.g., COT 14, and remote terminals, e.g., RT 20, located closer to the subscribers' telephone 22. Typically, remote terminal 20 is located within about two miles of the particular subscriber and the signaling between the central office terminal 14 and the remote terminal 20 is digital, termed a digital loop carrier or DLC 18. The DLC portion 18 is a 4-wire portion comprising two twisted wire pairs 18a and 18b, one of which carries downstream signals and the other of which carries signals upstream. For those subscribers that do not have digital service, a CODEC 24 in the RT interfaces with the subscriber's telephone equipment 22 and converts the signals between analog and digital. In the U.S., for example, in the digital loop carrier portion 18 of the network, voice (and data) is sampled at the rate of eight KHz and digitized into eight bit samples, yielding a 64 Kbps (8 KHz times 8 bits) data rate. A digitized voice channel (64 Kbps) is called a DS0. In many if not most digital loop carrier systems, 24 digitized voice channels (DSOS) are time division multiplexed into one signal called a DS1 signal.

When an ILEC provides local area telephone services to its subscribers using digital loop carrier systems between its RTs 20 and COTs 14, the signaling between terminals is all digital. However, when a CLEC provides the local area service and interconnects to the ILECs COT via an analog VF interconnection, a digital to analog conversion must be performed in the ILEC's channel unit before the data can be transmitted over the analog interface. Specifically, a channel unit 26 in the COT 14 must convert signals that are to be transmitted to the CLEC RT 16 over the interface 12 from digital to analog and convert signals received from the CLEC RT 16 from analog to digital.

The CLEC's switching fabric 29 typically is located in the CLEC's central office 31 at a remote location from the ILEC's central office 27. Accordingly, the CLEC's RT interfaces with the CLEC's Central Office via another link 33, which is commonly a digital carrier link, such as another DLC. Therefore, the CLEC's RT 16 must convert signals that are to be transmitted to the ILEC's COT 16 over the interface 12 from digital to analog and convert signals received from the ILEC's COT 16 from analog to digital. Accordingly, the ILEC's COT channel unit 26 and the CLEC's RT channel unit 28 both contain CODECs 25 for converting upstream channels through the interface 12 from analog to digital and converting downstream channels from digital to analog.

Further, the interface between the ILEC COT 14 and the CLEC RT 16 is a single twisted wire pair 12 in which upstream and downstream data are carried on the same wire pair, whereas the digital loop carrier portion of the system is a four wire system with the upstream and downstream signals being transmitted on separate twisted wire pairs. Therefore, each channel unit 14, 16 also includes a hybrid circuit 23 for converting between 2-wire (the interface side) and 4-wire (the DLC) transmission modes.

Specifically, there are at least three aspects of this link which degrade the service when signals are exchanged between the ILEC and the CLEC. First, there is an increase in background (or quantization) noise. Each time an analog to digital conversion occurs, quantizing noise is introduced because of the finite granularity of the digital code representing each sample of the analog signal. When the ILEC provides service, there is only one analog/digital conversion (at the ILEC's RT 20 or the ILEC's digital switch). However, when the CLEC provides analog-to-digital service, there are two analog-to-digital conversions namely, at the ILEC's RT and at the CLEC's RT 16. Accordingly, the background noise when service is provided by a CLEC can be twice that of when service is provided directly by the ILEC.

Secondly, additional noise is introduced by the repeated use of robbed bit signaling (RBS). Robbed bit signaling allows the digital voice or data bit stream to carry signal states necessary for supervision of telephone circuits. A robbed bit is sent in the least significant bit (LSB) position of every $6^{th}$ voice/data sample. In essence, one out of every 48 bits transmitted is "robbed" for supervisory purposes. When a CLEC provides service, the signals will contain an extra set of robbed bits since the CLEC will add its own robbed bit in its own network while the signal will still contain the robbed bit from the ILEC's network.

Thirdly, the back to back channel unit configuration used for interconnecting the CLEC and ILEC networks introduces two extra sources of echo. Specifically, when the interconnection between the ILEC and the CLEC is two wire, there must be a hybrid circuit in each channel unit to convert between 2- and 4-wire, thus introducing two more sources of echo in the link. The extra echoes can be avoided by using a 4-wire rather than a 2-wire interface.

A second option for the interface between the ILEC's COT and the CLEC's RT is a digital cross-connect system (DCS) I/O. A DCS I/O has a plurality, e.g., 24, of DS1 interfaces and a time slot interchange matrix that can be used to cross connect DS0 channels. However, a DCS I/O interface is expensive. Further, it provides only DS1 interfaces. Thus, bandwidth is wasted when less than 24 channels are being interconnected.

Another existing interface is the DS1 interconnection. However, like the DCS I/O solution, this type of interface also has 24 channels and is expensive. Accordingly, bandwidth is wasted when less than 24 channels are being interconnected.

Accordingly, it is an object of the present invention to provide an improved interface between the channel units of an ILEC and a CLEC.

SUMMARY OF THE INVENTION

In accordance with the invention, an interface between an incumbent local exchange carrier's central office terminal and a competitive local exchange carrier's remote terminal is provided by a modified Integrated Services Digital Network (ISDN) type interconnection. Preferably a modified Basic Rate ISDN U-Interface (BRI-U) in accordance with ANSI standard T1.601 is preferred. Such a connection provides two data clear channels of 64 Kbps each and two utility channels. The utility channels comprise a signaling channel of 16 Kbps and a framing/overhead channel of 16 Kbps (comprising 12 Kbps of ISDN framing structure and 4 Kbps of overhead). The total data rate of the BRI-U is 148 Kbps. The total bit rate is 160 Kbps. The 148 Kbps data signal can be carried over a single wire pair using a 2B1Q line code. The interface may be used to interconnect one or two 64 Kbps channels. The channel units may be designed to remove the robbed bits from the data channels and place them in either the signaling channel or the overhead channel. Also, a superframe (or extended superframe) synchronization signal can be transmitted in the 4 Kbps overhead portion of the framing/overhead channel so that the receiving channel unit can use that information to compensate for offset between its digital carrier frames and the digital carrier frames of the transmitting channel unit. Specifically, (1) the bit weights in the framing structures of the two networks should match so that the data samples are properly designated and (2) the robbed bit signaling should fall in the same bit positions for both networks so as to avoid double robbed bit signaling.

DETAILED DESCRIPTION OF THE INVENTION

Figure 2:
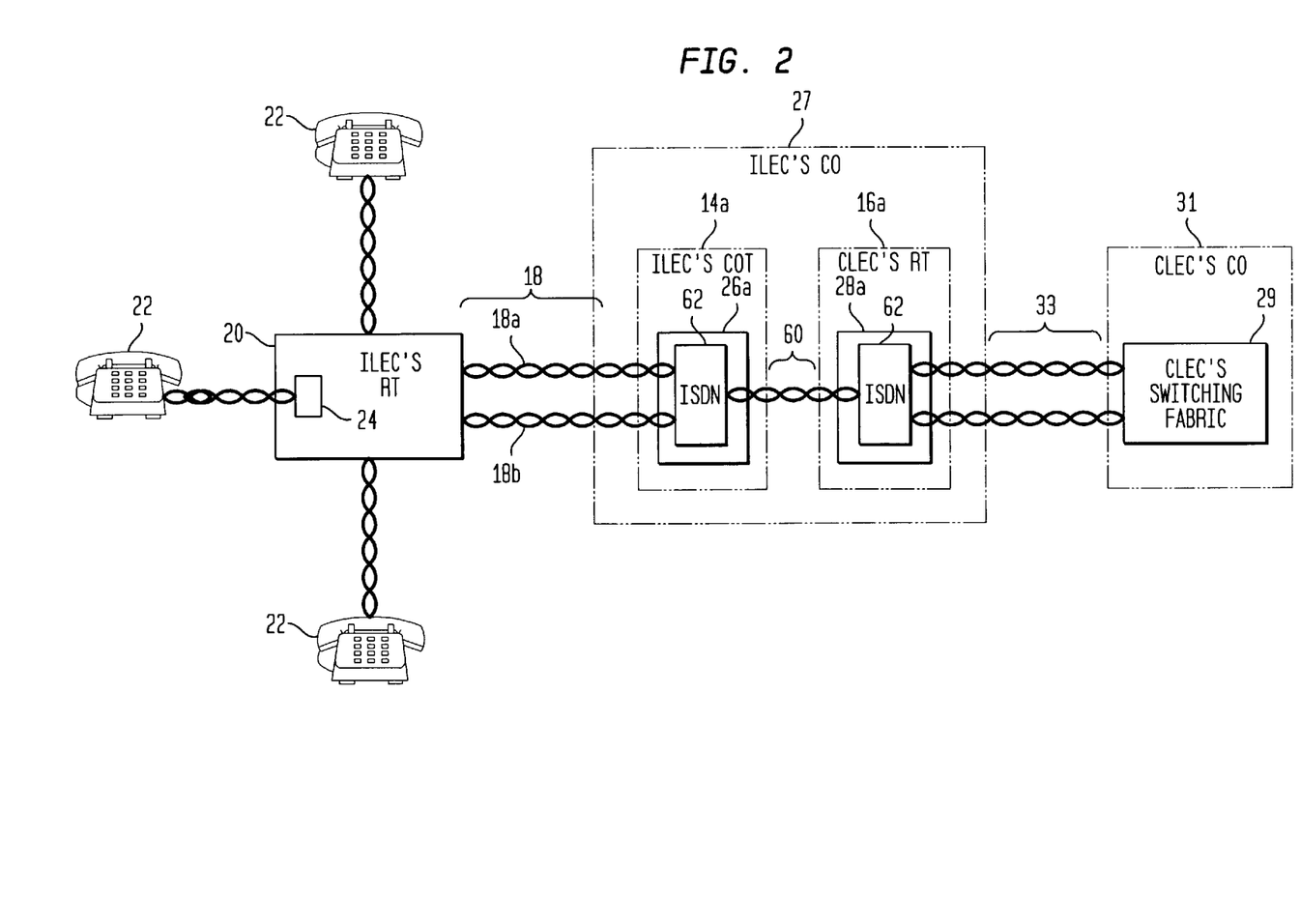
FIG. 2 is a block diagram of a telephone network including an incumbent local exchange carrier and a competitive local exchange carrier in accordance with the present invention.

FIG. 2 is a block diagram illustrating a telephone network including an interface between an ILEC and a CLEC in accordance with the present invention. The interface portion 60 between the ILEC and the CLEC comprises an ISDN interconnection. In a preferred embodiment, it is a 2 wire basic rate ISDN U-interface (BRI-U). In accordance with the invention, the ILEC's central office terminal (COT) 14a and the CLEC's remote terminal (RT) 16a have channel units 26a and 28a, respectively, that each include an ISDN interface 62, rather than the CODEC/hybrid circuit combination of the prior art. It should be understood that, in order not to obfuscate the description, FIGS. 1 and 2 omit much of the circuitry in the ILEC's COT and the CLEC's RT that is not relevant to the present invention. This is specifically true of the channel units, where the circuitry not related to the present invention is not shown in the figures.

The BRI-U protocol is standardized in accordance with ANSI specification T1.601. This standard provides two basic rate (64 Kbps) data channels (termed B channels), and two utility channels. The utility channels comprise a 16 Kbps signaling channel, and a 16 Kbps framing/overhead channel that is split between 12 Kbps for framing and 4 Kbps for overhead, for a total of 160 Kbps of which 148 Kbps is for data.

In a preferred embodiment of the invention, the channel units include processing capability to remove the robbed bit signaling from the data channels and place it in one of the utility channels. This may be accomplished by a programmed microprocessor, a micro controller, a state machine, combinational logic or any combination of the above.

Further, as described fully below, bit weights (i.e., data sample boundaries) as well as robbed bit signaling in the CLEC's network and the ILEC's network can be synchronized so that (1) sample boundaries are maintained across the interface and (2) both networks can use the same bit positions for robbed bit signaling such that only one robbed bit appears per every six frames.

In accordance with the invention, the interface is provided using standard Pulse Code Modulation (PCM) metallic interface circuitry commonly used for U-type (2-wire) digital subscriber line (U-DSL) integrated services digital network (ISDN) line cards of digital switches and by ISDN channel units of digital loop carriers (DLCs). Accordingly, the interface between the ILEC's channel unit and the CLEC's channel unit is accomplished without introducing extra quantization noise or detectable hybrid echo.

A 2-wire U-ISDN interface provides the necessary performance, however, a 4-wire T-ISDN interface also is possible. The CLEC's channel units and the interfacing ILECs channel unit, however, must use the same standard, U or T.

Figure 3:
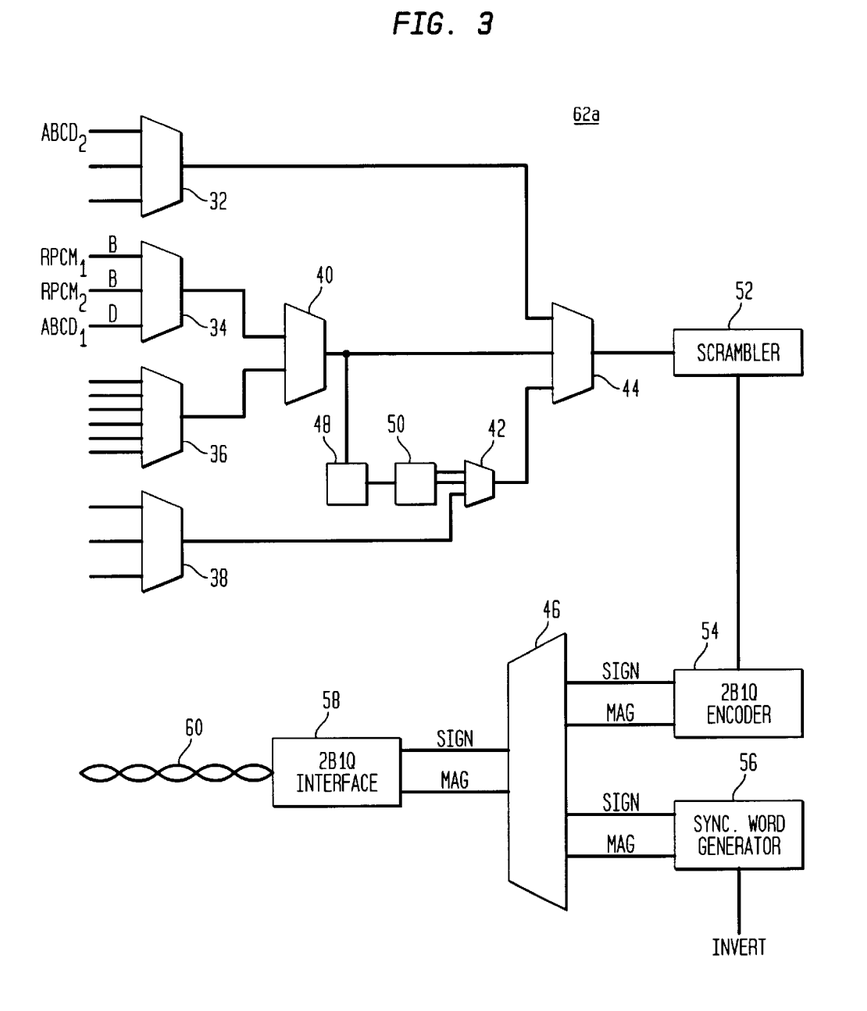
FIG. 3 is a circuit diagram illustrating an Integrated Services Digital Network transmit interface of a channel unit in accordance with the present invention.
Figure 4:
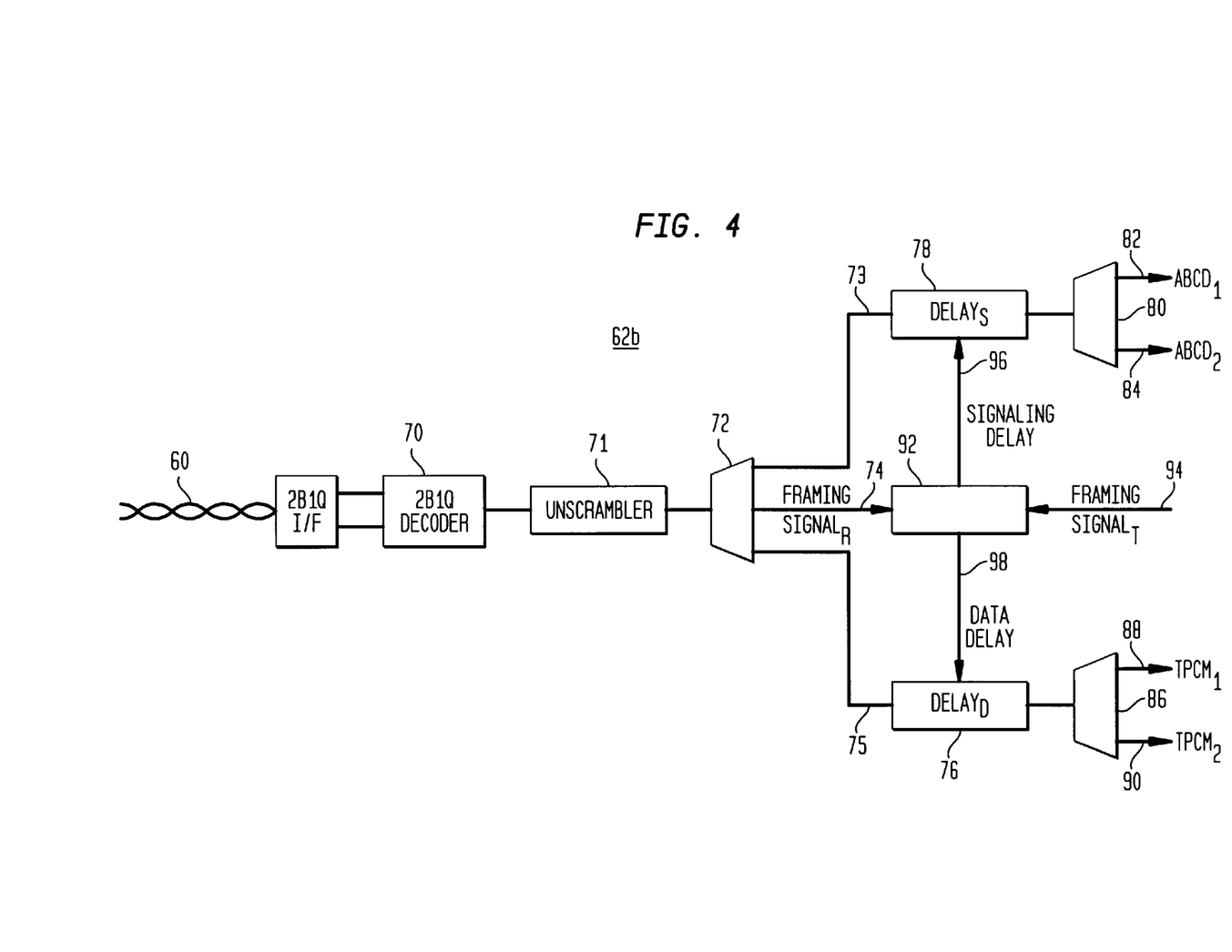
FIG. 4 is a block diagram illustrating an Integrated Services Digital Network receive interface of a channel unit in accordance with the present invention.

FIG. 3 is a circuit diagram of the transmit portion 62a of an ISDN interface of the present invention generally in accordance with ANSI specification T1.601-1992 entitled "Integrated Services Digital Network (ISDN)—Basic Access Interface for Use on Metallic Loops for Applications on the Network Side of the NT (layer 1 specification)". It should be understood that the interface also would include receive direction circuitry generally in accordance with ANSI specification T1.601-1992 and including complementary modifications to any described below in connection with the transmit direction circuitry. FIG. 4 is a blobkk diagram of corresponding receive direction circuitry. It also should be understood that the interface between an ILEC and a CLEC typically would comprise multiple copies of the ISDN interface of the present invention in order to provide pathways for a large number of telephone calls to be transferred between the ILEC and the CLEC.

As shown in FIG. 3, a standard ISDN transmit interface 62a comprises a plurality of multiplexes 32, 34, 36, 38, 40, 42, 44 for consolidating a plurality of digital signals, such as two voice/data channels and various signaling channels, onto a single tip and ring twisted wire pair. It also includes a cyclic redundancy code generator 48 and associated latch 50 for correcting errors that might occur on the two-wire analog line. The output of multiplexer 44 is passed through a scrambler 52 that rearranges the bits of the combined signal to remove repetitive patterns and to reduce correlation between the transmitted and received signals. The reduction of correlation between the transmitted and received signals also improves the quality of the hybrid balance circuit (not shown) that is part of a standard ISDN interface and which interconnects the wire pair 60, the ISDN transmit circuit 62a and the ISDN receive circuit (not shown in FIG. 3) of the same channel unit. The output of scrambler 52 feeds into a 2B1Q encoder 54 which encodes the signal and outputs two separate signals comprising a sign portion and a magnitude portion. One final multiplexer 46 consolidates the sign and magnitude signals with a sign and magnitude of a synchronization word generated in a synchronization generator 56. The synchronization process is not pertinent to the present invention and therefore is not discussed in detail herein. However, it is a well known aspect of the ISDN framing process.

Multiplexer 46 is followed by a 2B1Q line interface which further conditions the data and outputs it onto the tip and ring wire pair.

Let us assume for exemplary purposes that circuit 62a is in the ILEC's channel unit 14a. The inputs of this exemplary ISDN transmission interface would be coupled to the local DLC through the remainder of the CO channel unit 14a. At the output, wire pair 60 is the wire interface between the ISDN interface circuits of the two facing channel units 14a, 16a.

Since the interface in accordance with a preferred embodiment of the present invention is used to interface two 64 Kbps voice/data channels and their associated signaling information, only 3 or 4 of the input terminals of the first level of multiplexers, i.e., multiplexers 32, 34, 36 and 38, need be used. For instance, in one embodiment of the invention (not specifically illustrated), multiplexer 34, which, in the ANSI T1.601.2 protocol, has 3 inputs, i.e., two for data/voice channels (termed B channels in ISDN lingo) and one for the signaling channel (termed D channel in ISDN lingo) can be used exactly as intended with the D input used to input signaling information for both data channels.

Alternately, and as expressly illustrated in FIG. 3, the two B inputs of multiplexer 34 can be used to input the two data/voice channels, the D input can be used to input the signaling corresponding to one of the data channels and one of the inputs of multiplexer 32 can be used for inputting the signaling information for the other data/voice channel. The remaining inputs are unused or can be used for any additional signaling that might be desired.

As a practical matter, the ILEC is likely to use a DLC signaling protocol different from that of the CLEC. For instance, many, if not most, ILECs utilize Bellcore signaling protocol TR-TSY-000008. However, a CLEC is more likely to utilize the GR-303-CORE signaling protocol. Accordingly, the channel units 62 would need to include a function for translating between the two signaling protocols utilized by the ILEC and the CLEC. Various designs for an appropriate translation functionality would be readily apparent to persons of ordinary skill in the related arts and could be implemented by a wide variety of means, including, but not limited to, microprocessor, state machine, micro controller, and combinational logic circuitry.

In order to maintain sample boundaries in the data channels transmitted over the interface, information as to the phasing of the frame structure in the network corresponding to the transmitting channel unit must be transmitted over the interface. More specifically, the offset between the overall framing structures of the two facing networks must be determined at the receiving channel unit to maintain the sample boundaries in the data channels transmitted over the interface. The receiving channel unit should delay placing the data channel bitstreams received over the interface into its framing structure by an appropriate delay period so that the received data samples correctly fall into the sample slots of the overall framing structure of the receiving network.

Additionally, as is well known in the art, digital loop carriers typically utilize a robbed bit signaling protocol. In a robbed bit protocol, the least significant bit of every sixth frame is "robbed". By "robbed" it is meant that the data in that bit position is replaced with a signaling bit which can be used, for instance, for coordinating the equipment at opposite ends of a telephone circuit. With respect to a telephone call carrying voice data, one or even two robbed bits every six frames typically is negligible and will not reduce the quality of the call noticeably. However, with respect to digital data transmissions, robbed bit signaling reduces the data rate of transmission since 1 out of every 48 (6×8) bits cannot contain data. If there are two robbed bits every 6 frames, then the data rate is reduced even further since 2 of every 48 bits is a signaling bit rather than data.

Digital carrier systems with robbed bit signaling utilize a protocol by which the position of the robbed bit signaling within the framing pattern is determined by the equipment at the remote end. Note that the frames discussed here and below are the frames used by the digital carrier systems within the ILEC and CLEC and not the previously mentioned ISDN frame within which the voice/data, singaling, and maintenance bits are transmitted.

Thus, in addition to synchronizing the sample boundaries of the DLC's of the ILEC and CLEC, it also is desirable to synchronize the robbed bit signaling of the DLCs of the ILEC and CLEC so that any robbed bit signaling of the two DLCs will overlap, i.e., robbed bits inserted by both networks will use the same bit positions. Otherwise, calls that are routed through the CLEC's domain will contain two robbed bits for every six samples rather than one, thus further decreasing data bandwidth.

Accordingly, in a preferred embodiment of the invention, the channel units are designed to generate and transmit over one of the utility channels data indicative of the frame phasing of the transmitting network. For example, data indicating the start of a frame would be adequate. Typically, DLCs utilize either a superframe (SF) or extended superframe (ESF) format. As is well known in the art, the SF format comprises 12 frame intervals, while the ESF format comprises 24 frame intervals.

In both formats, basic frames (a basic frame comprises 24 channels of 8 bit samples plus one framing bit) are 193 bits wide and every sixth basic frame is designated a signaling frame. The LSB of each signaling frame is a robbed bit signaling bit.

The frame phasing information may be transmitted as simply as by changing a continuous stream of zeros in the overhead channel to a short burst of ones at the beginning of the "A" signaling frame of the SF or ESF. A circuit for generating and transmitting the frame phasing information may take any form, including, but not limited to, a microprocessor, a micro controller, a state machine, a digital signal processor, combinational logic gates and analog circuitry.

With the phasing information transmitted over a utility channel, the facing channel unit can determine (1) the offset between the overall framing structure in its corresponding network and the overall framing structure in the facing network's DLC to maintain sample boundaries and (2) the offset between the signaling bits in its network and the signaling bits of the other network's DLC (ABCD in FIGS. 3 and 4) so that the robbed bit position for both networks can be matched.

With respect to robbed bit signaling, the offset between corresponding signaling frames (A to A, B to B, etc.) of the facing networks can be anywhere between 0 and 11 frame periods for superframe structure or between 0 and 23 frame periods for extended superframe structure. The receiving channel unit should delay the signaling bitstream received over the interface by the determined offset period before inserting the signaling data into the frames of the corresponding network so that the robbed bits inserted by the receiving network will use the same bit positions as the robbed bits of the transmitting network. Thus, there will be only one robbed bit per every six frames.

Those of skill in the art will recognize that there are many ways to achieve the necessary delays. One simple solution is to include controllable delay buffers in the receive circuitry of the channel units that is controlled by the offset timing information in order to delay the relevant bitstreams received over the interface by the appropriate duration before inserting that data into the frames of the corresponding network.

For instance, FIG. 4 is a block diagram illustrating a receive circuit portion 62b of an ISDN interface 62 in accordance with one preferred embodiment of the invention. It is generally complementary to the transmit circuit portion 62a discussed above and shown in detail in FIG. 3 and should be mostly self explanatory to those of skill in the related arts in view of the discussion of FIG. 3 above. The ISDN signal is received over twisted wire pair 60 from the transmit circuitry 62a of the facing channel unit in 2B1Q encoding. A 2B1Q line decoder 70 decodes the signal. Descrambler 71 descrambles the bits to place them back in original order. Demultiplexer 72 partially demultiplexes the signal received over the ISDN interface into its various channels, including the signaling channels (other than the framing signals) on line 73, the framing signals on line 74, and the data channels on line 75. Signaling delay buffer 78 is interposed in path 73 and data delay buffer 76 is interposed in path 75. The output of signaling delay buffer 78 is further demultiplexed by demultiplexer 80 into signaling channels 82 and 84 corresponding to each of the signaling channels, respectively. The output of data delay buffer 76 is further demultiplexed by demultiplexer 86 into the two distinct data channels 88 and 90, respectively.

A circuit 92 receives the framing signal from the other network on line 74 as well as the framing signal from its own network on line 94 and determines the frame structure offset between the two networks. Based on the offset information, it generates a signaling delay signal 96 for controlling signaling delay buffer 78 to delay the signaling channel by the appropriate number of frame periods (0 through 5 frames) needed to cause the robbed bit signaling to match up with the robbed bit signaling inserted in the transmitting network. It further generates a data delay signal on line 98 for controlling data delay buffer 76 to delay the data bitstream by the appropriate number of bit periods so that the sample boundaries in the data channels received over the interface are maintained in the receiving network.

The robbed bit signaling synchronization feature of the present invention is possible due to the availability of multiple non-data (i.e., maintenance) links in accordance with the ISDN standard circuitry. In typical ISDN applications, these data links are needed to allow the network to monitor the health of the ISDN terminal at the subscriber location. However, for the present application, none of that maintenance information is necessary and the signaling and overhead channels can be used as described above. In fact, those channels can be used to transmit any other maintenance information that may be desirable. FIG. 3, for example, shows the synchronization (framing) signal being input to multiplexer 32.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. For instance, an embodiment of the invention using a T-type ISDN interface would adhere to the construct disclosed in ANSI specification T1.605. The invention is limited only as defined in the following claims and equivalents thereto.

What is claimed is:

1. A circuit for interfacing between a digital loop carrier that forms at least a portion of a first telephone network interconnecting a plurality of subscribers for providing communications service to said subscribers and a second telephone network for providing alternate communications service to said subscribers, said circuit for interfacing comprising an integrated services digital network interface having a first data channel, a second data channel, and a utility channel, wherein communications data is transported between said first network and said second network over said data channels and wherein said utility channel provides robbed bit signaling information for said first or second data channel.

2. The circuit set forth in claim 1 wherein said integrated services digital network interface comprises a first channel unit corresponding to said first network and a second channel unit corresponding to said second network.

3. The circuit set forth in claim 1 wherein said interface is a U-type integrated services digital network interface.

4. The circuit set forth in claim 1 wherein said circuit comprises two facing integrated services digital network interfaces.

5. The circuit set forth in claim 1 wherein said integrated services digital network interface comprises a Basic Rate integrated services digital network interface.

6. The circuit set forth in claim 5 wherein said integrated services digital network interface comprises a Basic Rate integrated services digital network interface in accordance with ANSI specification T1.601-1992.

7. The circuit set forth in claim 1 wherein said interface is a T-type integrated services digital network interface.

8. The circuit set forth in claim 2 wherein said integrated services digital network interface further comprises a first circuit in at least one of said channel units for generating a signal indicative of frame phasing in said network corresponding to said channel unit and placing said frame phasing information on said utility channel.

9. The circuit set forth in claim 8 wherein each of said first and second channel units includes said first circuit.

10. The circuit set forth in claim 9 wherein said frame phasing signal indicates the start of a transmission frame.

11. The circuit set forth in claim 10 further comprising a second circuit in at least the other of said channel units for receiving said frame phase signal and delaying signals received over said data channels of said interface such that robbed bit signaling in said first and second networks overlap with respect to data transferred over said interface.

12. The circuit set forth in claim 11 wherein:
said first and second networks have first and second framing structures, respectively;
said robbed bit signaling information is transmitted over said interface in said utility channel; and
said second circuit delays said utility channel such that robbed bit signaling in said first and second networks overlap with respect to data transferred over said interface and delays said data channels such that bits of said communications data transmitted over said interface are assigned a bit weight, wherein said bit weight for bits in said first framing structure and said second framing structure are equal.

13. The circuit set forth in claim 12 wherein each of said first and second channel units includes said second circuit.

14. The circuit set forth in claim 13 wherein said second circuit comprises a programmable delay buffer.

15. The circuit set forth in claim 1 wherein said integrated services digital network interface uses a 2B1Q line code.

16. An interface between a digital loop carrier that forms at least a portion of a first telephone network interconnecting a plurality of subscribers for providing communications service to said subscribers and a second telephone network for providing alternate communications service to said subscribers, said interface comprising:
a first channel unit associated with said first network comprising a first integrated services digital network interface;
a second channel unit associated with said second network comprising a second integrated services digital network interface; and
a wire pair interconnecting said first and second integrated services digital network interfaces;
wherein each of said first and second integrated services digital network interfaces comprise a first data channel, a second data channel, and a utility channel and wherein communications data is transported between said first network and said second network over said data channels wherein said utility channel provides robbed bit signaling information for said first or second data channel.

17. The circuit set forth in claim 16 wherein said interface is a U-type integrated services digital network interface.

18. The circuit set forth in claim 16 wherein said interface is a T-type integrated services digital network interface and said wire pair comprises two wire pairs.

19. The circuit set forth in claim 16 wherein said integrated services digital network interface comprises a Basic Rate integrated services digital network interface.

20. The circuit set forth in claim 19 wherein said integrated services digital network interface comprises a Basic Rate integrated services digital network interface in accordance with ANSI specification T1.601-1992.

21. The circuit set forth in claim 16 wherein communications data is transported between said first network and said second network over said data channels, said integrated services digital network interface further comprising a first circuit in at least one of said channel units for generating a signal indicative of frame phasing in said network corresponding to said channel unit and placing said frame phasing information on said utility channel.

22. The circuit set forth in claim 21 wherein each of said first and second channel units includes said first circuit.

23. The circuit set forth in claim 22 wherein said frame phasing signal indicates a start of a transmission frame.

24. The circuit set forth in claim 23 further comprising a second circuit in at least the other of said channel units for receiving said frame phase signal and delaying data received over said data channels of said interface such that robbed bit signaling in said first and second networks overlap with respect to data transferred over said interface.

25. The circuit set forth in claim 24 wherein:
said first and second networks have first and second framing structures, respectively;
said robbed bit signaling information is transmitted over said interface in said utility channel; and
said second circuit delays said utility channel such that robbed bit signaling in said first and second networks overlap with respect to data transferred over said interface and delays said data channels such that bits of said communications data transmitted over said interface are assigned a bit weight, wherein said bit weight for bits in said first framing structure and said second framing structure are equal.

26. The circuit set forth in claim 25 wherein each of said first and second channel units includes said second circuit.

27. The circuit set forth in claim 26 wherein said second circuit comprises a programmable delay buffer.

28. The circuit set forth in claim 16 wherein said integrated services digital network interface uses a 2B1Q line code.

29. The circuit set forth in claim 16 wherein said second telephone network comprises a second digital loop carrier coupled to said second channel unit.

30. A method of interconnecting a first telephone network of a competitive local exchange carrier to a second telephone network of an incumbent local exchange carrier that interconnects a plurality of subscribers, said second telephone network comprising a digital subscriber loop, said method comprising the step of:
transporting telephone calls between said first and second telephone networks using an integrated services digital network interface having a first data channel, a second data channel and a utility channel, wherein communications data is transported between said first network and said second network over said data channels and wherein said utility channel provides robbed bit signaling information for said first or second data channel.

31. The method set forth in claim 30 wherein said step comprises using a U-type integrated services digital network interface.

32. The method set forth in claim 30 wherein said step comprises using first and second facing integrated services digital network interfaces corresponding to said first and second networks, respectively.

33. The method set forth in claim 30 wherein said step comprises using a Basic Rate integrated services digital network interface.

34. The method set forth in claim 33 wherein said step comprises using a Basic Rate integrated services digital network interface in accordance with ANSI specification T1.601-1992.

35. The method set forth in claim 32 wherein said step comprises using a T-type integrated services digital network interface.

36. The method set forth in claim 34 further comprising the step of:

transporting between said first and second networks a signal indicative of frame phasing in a transmitting one of said networks.

37. The circuit set forth in claim 36 wherein said frame phasing signal indicates a start of a frame.

38. The circuit set forth in claim 37 further comprising the steps of:

receiving said frame phasing signal in a receiving one of said networks;

delaying data received over said interface such that robbed bit signaling in said first and second networks overlap with respect to data transported over said interface and such that bits of data of said telephone calls transmitted over said interface are assigned a bit weight, wherein said bit weight for bits in said first framing structure and said second framing structure are equal.

39. The circuit set forth in claim 37 wherein said method further comprising the step of:

generating a signal indicative of the location of robbed bit signaling in said transmitted frame and transporting said signal over said utility channel.

40. The method set forth in claim 30 further comprising the step of:

using a 2B1Q line code over said interface.

* * * * *